United States Patent

Kimura

(10) Patent No.: US 6,816,759 B2
(45) Date of Patent: Nov. 9, 2004

(54) POWER OUTPUT APPARATUS AND AUTOMOBILE

(75) Inventor: Akihiro Kimura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/401,570

(22) Filed: Mar. 31, 2003

(65) Prior Publication Data

US 2004/0006419 A1 Jan. 8, 2004

(30) Foreign Application Priority Data

Apr. 9, 2002 (JP) ........................................ 2002-106756
Mar. 20, 2003 (JP) ........................................ 2003-078065

(51) Int. Cl.[7] ................................................. G06G 7/70
(52) U.S. Cl. ...................... 701/22; 180/65.2; 180/233; 180/242; 701/101; 701/112
(58) Field of Search ............................... 701/22, 36, 1, 701/101, 112; 180/65.2, 65.3, 65.4, 65.1, 233, 242

(56) References Cited

U.S. PATENT DOCUMENTS 5,988,307 A * 11/1999 Yamada et al. ............. 180/243
6,672,415 B1 * 1/2004 Tabata ....................... 180/65.2

FOREIGN PATENT DOCUMENTS

JP 50-78724 6/1975
JP U 4-79942 7/1992

* cited by examiner

Primary Examiner—Thomas G. Black
Assistant Examiner—Olga Hernandez
(74) Attorney, Agent, or Firm—Oliff & Berridge, PLC

(57) ABSTRACT

In a motor drive mode of a hybrid vehicle where an engine is at a stop and the vehicle is driven with only the power from a motor, the motor is driven and controlled in a range up to a specific electric power, which is calculated by subtracting a starting electric power Ps required to start the engine from a maximum electric power Pmax output from a battery. At the time of starting the engine, the control stops the operations of auxiliary machinery, which is driven with the electric power from the battery, until completion of the start of the engine.

20 Claims, 5 Drawing Sheets

POWER OUTPUT APPARATUS AND AUTOMOBILE

BACKGROUND OF THE INVENTION

1. Field of the Invention

The present invention relates to a power output apparatus and an automobile. More specifically the invention pertains to a power output apparatus that is capable of outputting the power from an internal combustion engine and the power from a driving motor to a drive shaft, as well as to an automobile that is driven with the power from the internal combustion engine and the power from the driving motor, which are output to the drive shaft linked with an axle.

2. Description of the Prior Art

A proposed power output apparatus disconnects a generator, which uses the power of an output shaft of an internal combustion engine to generate electric power, in the process of starting the internal combustion engine (for example, JAPANESE UTILITY MODEL LAID-OPEN GAZETTE No. 4-79942). This power output apparatus separates the generator from the output shaft of the internal combustion engine at the time of starting the internal combustion engine, thereby reducing the load applied to the internal combustion engine at the start thereof and improving the starting ability of the internal combustion engine.

The technique of disconnecting the generator from the internal combustion engine at the starting time is applicable to a start of the internal combustion engine in the driving state of a motor in a power output apparatus where the power from the internal combustion engine and the power from the motor are output to a drive shaft. The prior art technique, however, does not take into account the effects of the motor in the driving state on the start of the internal combustion engine. In a hybrid vehicle with such a power output apparatus mounted thereon, the start of the internal combustion engine in the course of a drive with the motor is an important issue to specify the drivable range with the motor.

SUMMARY OF THE INVENTION

The object of the present invention is thus to extend a drivable range with a motor in a power output apparatus that outputs the power from an internal combustion engine and the power from the motor to a drive shaft as well as in an automobile that is driven with the power output from the internal combustion engine and the power from the motor to the drive shaft. The object of the invention is also to attain a smooth start of the internal combustion engine in the power output apparatus and the automobile.

In order to achieve at least a part of the aforementioned objects, the power output apparatus and the automobile of the present invention are structured as follows.

The power output apparatus of the present invention is capable of outputting power from an internal combustion engine and power from a driving motor to a drive shaft, the power output apparatus including: a secondary battery that supplies electric power to the driving motor; a starting module that starts the internal combustion engine with a supply of electric power from the secondary battery; and a control module that drives and controls the driving motor to output a required power in a preset range of driving electric power to the drive shaft while the internal combustion engine is at a stop, where the range of driving electric power is set as a difference between a maximum electric power output from the secondary battery and a starting electric power required by the starting module to start the internal combustion engine.

The power output apparatus of the present invention drives and controls the driving motor to output a required power in a preset range of driving electric power to the drive shaft while the internal combustion engine is at a stop. Here the range of driving electric power is set as a difference between a maximum electric power output from the secondary battery and a starting electric power required by the starting module to start the internal combustion engine. This arrangement enables the internal combustion engine to be started immediately in response to a starting requirement of the internal combustion engine, and effectively prevents the power output from the driving motor from being varied in the course of starting the internal combustion engine.

As one aspect of the power output apparatus in the present invention further including: at least one auxiliary machinery that is driven with a supply of electric power from said secondary battery; wherein said control module drives and controls said at least one auxiliary machinery to stop its operation until completion of a start of said internal combustion engine, while controlling said starting module to start said internal combustion engine, in response to a starting requirement of said internal combustion engine that is at a stop. In this case, the power output apparatus stops the operations of the auxiliary machinery at the time of starting the internal combustion engine. This arrangement desirably heightens the level of the driving electric power used for the driving motor by the electric power required for driving the auxiliary machinery and thereby extends the drivable range with the driving motor, compared with the prior art structure of controlling the driving motor in a differential range obtained as subtraction of the electric power required for driving the auxiliary machinery and the electric power required for starting the internal combustion engine from the maximum electric power output from the secondary battery.

As another aspect of the power output apparatus in the present invention, the control module may control the starting module to start the internal combustion engine in a continuous driving state of the at least one auxiliary machinery, in response to the starting requirement of the internal combustion engine, when the driving motor is driven and controlled to output the required power to the drive shaft in a specific range of electric power calculated by subtracting electric power required for actuation of the at least one auxiliary machinery from the driving electric power. Further, the control module may set the starting electric power in such a manner as to be lowered with an increase in revolving speed of the drive shaft, calculate the driving electric power from the setting of the starting electric power to drive and control the driving motor with the calculated driving electric power, and control the starting module to start the internal combustion engine with the setting of the starting electric power.

As another aspect, the power output apparatus of the present invention further including: a three-shaft power input and output module that has a first shaft linked with an output shaft of the internal combustion engine, a second shaft linked with the drive shaft, and a third shaft, where power input into and output from a residual one shaft among the three shafts is determined according to powers input into and output from any two shafts among the three shafts, wherein the starting module may include a starting motor that is linked with the third shaft and is capable of generating electric power, and the driving motor may be linked with the drive shaft.

The technique of the present invention is not restricted to the power output apparatus discussed above, but may be applicable to a moving body, such as an automobile. The power output apparatus and the automobile are only examples of application of the invention. The principle of the invention is also attained by a control method.

DESCRIPTION OF THE PREFERRED EMBODIMENTS

Figure 1:
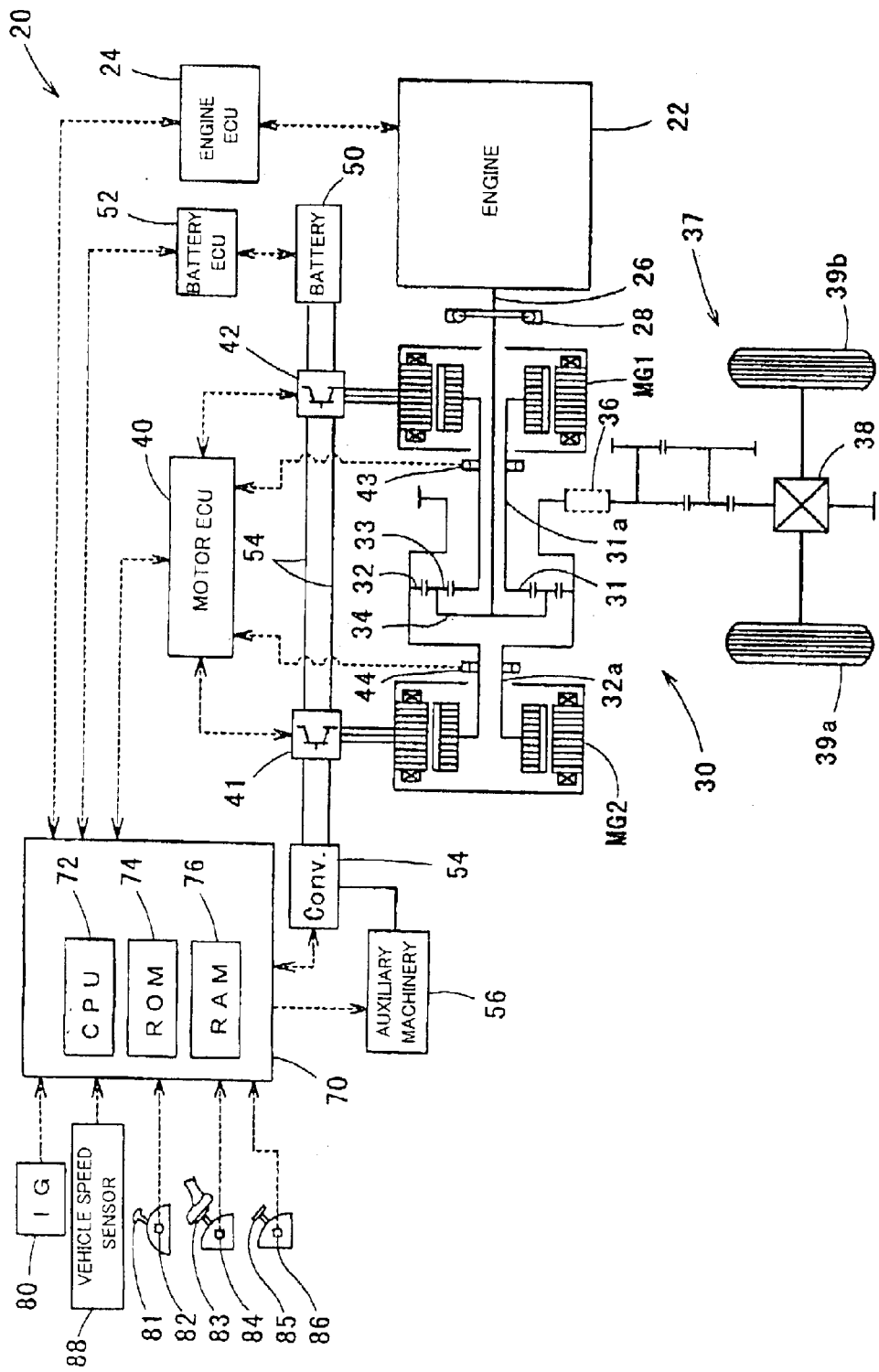
FIG. 1 schematically illustrates the structure of a hybrid vehicle 20 with a power output apparatus mounted thereon in one embodiment of the present invention.

One mode of carrying out the present invention is discussed below as a preferred embodiment. FIG. 1 schematically illustrates the structure of a hybrid vehicle 20 with a power output apparatus mounted thereon in one embodiment of the present invention. The hybrid vehicle 20 of the embodiment includes an engine 22, a triaxial power distribution integration mechanism 30 that is connected to a crankshaft 26 or an output shaft of the engine 22 via a damper 28, a motor MG1 that is connected to the power distribution integration mechanism 30 to generate electric power, another motor MG2 that is connected to the power distribution integration mechanism 30, and a hybrid electronic control unit 70 that controls the whole driving system of driving wheels.

The engine 22 is an internal combustion engine that outputs power using a hydrocarbon fuel, such as gasoline or diesel oil. An engine electronic control unit (hereinafter referred to as engine ECU) 24 receives signals from diverse sensors that detect the driving conditions of the engine 22, and controls the operations of the engine 22 including the control of fuel injection, the control of ignition, and the regulation of the intake air flow. The engine ECU 24 communicates with the hybrid electronic control unit 70 and controls the operations of the engine 22 in response to control signals from the hybrid electronic control unit 70 while outputting data regarding the driving conditions of the engine 22 to the hybrid electronic control unit 70 according to the requirements.

The power distribution integration mechanism 30 includes a sun gear 31 as an external gear, a ring gear 32 as an internal gear arranged concentrically with the sun gear 31, multiple pinion gears 33 engaging with both the sun gear 31 and the ring gear 32, and a carrier 34 holding the multiple pinion gears 33 in such a manner that allows both revolution and rotation on its axis. Namely the power distribution integration mechanism 30 is constructed as a planetary gear mechanism that attains differential actions with the sun gear 31, the ring gear 32, and the carrier 34 as rotational elements. In the power distribution integration mechanism 30, the crankshaft 26 of the engine 22, the motor MG1, and the motor MG2 are respectively linked with the carrier 34, the sun gear 31, and the ring gear 32. When the motor MG1 works as an electric generator, the power of the engine 22 input via the carrier 34 is distributed into the sun gear 31 and the ring gear 32 according to their gear ratio. When the motor MG1 works as an electric motor, on the other hand, the power of the engine 22 input via the carrier 34 and the power of the motor MG1 input via the sun gear 31 are integrated and output to the ring gear 32. The ring gear 32 is mechanically linked with front driving wheels 39a and 39b of the vehicle via a belt 36, a gear mechanism 37, and a differential gear 38. The power output to the ring gear 32 is accordingly transmitted to the driving wheels 39a and 39b via the belt 36, the gear mechanism 37, and the differential gear 38. In the driving system, the three shafts connected to the power distribution and integration mechanism 30 include the output shaft of the engine 22 or the crankshaft 26 that is coupled with the carrier 34, a rotating shaft of the motor MG1 or a sun gear shaft 31a that is coupled with the sun gear 31, and a drive shaft or a ring gear shaft 32a that is coupled with the ring gear 32 and is mechanically linked with the driving wheels 39a and 39b.

Both of the motors MG1 and MG2 are constructed as known synchronous generator motors, which are driven as an electric generator as well as an electric motor. The motors MG1 and MG2 transmit electric power from and to a battery 50 via inverters 41 and 42. A power line 54 connecting the inverters 41 and 42 with the battery 50 includes a positive terminal bus line and a negative terminal bus line shared by the two inverters 41 and 42. This arrangement enables the electric power generated by one of the motors MG1 and MG2 to be consumed by the other motor. The battery 50 is charged with the excess electric power of the motor MG1 or the motor MG2 and is discharged to supplement the insufficient electric power of the motor MG1 or the motor MG2. The battery 50 is neither charged not discharged when there is an electric power balance by the motors MG1 and MG2. The motors MG1 and MG2 are both driven and controlled by a motor electronic control unit (hereinafter referred to as motor ECU) 40. The motor ECU 40 receives signals required for driving and controlling the motors MG1 and MG2, for example, signals from rotational position detection sensors 43 and 44 that detect the rotational positions of rotors in the motors MG1 and MG2 and values of phase electric currents supplied to the motors MG1 and MG2 and detected by non-illustrated electric current sensors. The motor ECU 40 outputs switching control signals to the inverters 41 and 42. The motor ECU 40 calculates revolving speeds Nm1 and Nm2 of the rotors in the motors MG1 and MG2 from the signals input from the rotational position detection sensors 43 and 44 according to a revolving speed calculation routine (not shown). Since the motor MG1 is linked with the sun gear 31 and the motor MG2 is linked with the ring gear 32, the revolving speeds Nm1 and Nm2 correspond to the revolving speeds of the sun gear shaft 31a and the ring gear shaft 32a. The motor ECU 40 communicates with the hybrid electronic control unit 70 and drives and controls the motors MG1 and MG2 in response to control signals from the hybrid electronic control unit 70 while outputting data regarding the driving conditions of the motors MG1 and MG2 to the hybrid electronic control unit 70 according to the requirements.

The battery 50 is controlled by a battery electronic control unit (hereinafter referred to as battery ECU) 52. The battery ECU 52 receives signals required for controlling the battery 50, for example, a value of inter-terminal voltage measured by a non-illustrated voltage sensor disposed between terminals of the battery 50, a value of charge discharge electric current measured by a non-illustrated electric current sensor attached to the power line 54 connecting with an output terminal of the battery 50, and a battery temperature measured by a non-illustrated temperature sensor attached to the battery 50. The battery ECU 52 outputs data regarding the conditions of the battery 50 to the hybrid electronic control unit 70 via communication according to the requirements. The battery ECU 52 computes a state of charge (SOC) from an accumulated value of the charge discharge electric current measured by the electric current sensor for controlling the battery 50.

The power line 54 connected to the output terminal of the battery 50 is also connected via a DC-DC converter 54 to auxiliary machinery 56 required for the hybrid vehicle 20. The driving electric power is supplied from the battery 50 to the auxiliary machinery 56. There are a diversity of the auxiliary machinery 56, for example, a compressor of an air conditioner and an electrically operated pump for feeding lubrication oil to the power distribution and integration mechanism 30.

The hybrid electronic control unit 70 is constructed as a microprocessor including a CPU 72, a ROM 74 that stores processing programs, a RAM 76 that temporarily stores data, and an input-output port and a communication port (not shown). The hybrid electronic control unit 70 receives input of various data and signals via the input port. The input includes, for example, electric currents and voltages transmitted from ammeters and voltmeters (not shown) attached to the DC-DC converter 54, an ignition signal transmitted from an ignition switch 80, a gearshift position SP transmitted from a gearshift position sensor 82 that detects the operating position of a gearshift lever 81, an accelerator opening Acc corresponding to the step-on amount of an accelerator pedal 83 transmitted from an accelerator pedal position sensor 84, a brake pedal position BP corresponding to the step-on amount of a brake pedal 85 transmitted from a brake pedal position sensor 86, and a vehicle speed V measured by a vehicle speed sensor 88. The hybrid electronic control unit 70 outputs various signals, such as driving signals to the diverse auxiliary machinery 56 and control signals to the DC-DC converter 54, via the output port. As mentioned previously, the hybrid electronic control unit 70 connects with the engine ECU 24, the motor ECU 40, and the battery ECU 52 via the communication port and transmits various control signals and data to and from the engine ECU 24, the motor ECU 40, and the battery ECU 52.

The hybrid vehicle 20 of the embodiment thus constructed calculates a required power, which is to be output to the ring gear shaft 32*a* or the drive shaft, based on the accelerator opening Acc corresponding to the driver's step-on amount of the accelerator pedal 83 and the vehicle speed V. The engine 22 and the motors MG1 and MG2 are under operation control to enable the calculated required power to be actually output to the ring gear shaft 32*a*. The operation control of the engine 22 and the motors MG1 and MG2 has multiple modes, a torque conversion drive mode, a charge-discharge drive mode, and a motor drive mode. In the torque conversion drive mode, the engine 22 is under operation control to output a power equivalent to the required power. The motors MG1 and MG2 are driven and controlled to cause the total power output from the engine 22 to be subjected to the torque conversion by means of the power distribution and integration mechanism 30 and the motors MG1 and MG2 and to be output to the ring gear shaft 32*a*. In the charge-discharge drive mode, the engine 22 is under operation control to output a power equivalent to the sum of the required power and an electric power used for charging and discharging the battery 50. The motors MG1 and MG2 are driven and controlled to cause all or part of the power output from the engine 22 with a charge or a discharge of the battery 50 to be subjected to the torque conversion by means of the power distribution and integration mechanism 30 and the motors MG1 and MG2 and to be output as the required power to the ring gear shaft 32*a*. In the motor drive mode, the operation of the engine 22 is at a stop, while the motor MG2 is driven and controlled to output a power equivalent to the required power to the ring gear shaft 32*a*.

The following describes a series of operations carried out in response to an instruction of starting the engine 22 given during a run of the hybrid vehicle 20 of the embodiment in the motor drive mode. The instruction of starting the engine 22 is given, for example, when the vehicle speed VB actually increases to or over a preset level by the ordinary accelerator stepping-on action on a relatively level road, when the driver stamps on the accelerator pedal 83 to actually or presumably make the power generated by the motor 2 insufficient for the required power, and when it is required to charge the battery 50 or limit the discharge from the battery 50, based on the state of charge (SOC) of the battery 50 and the electric power output from the battery 50.

Figure 2:
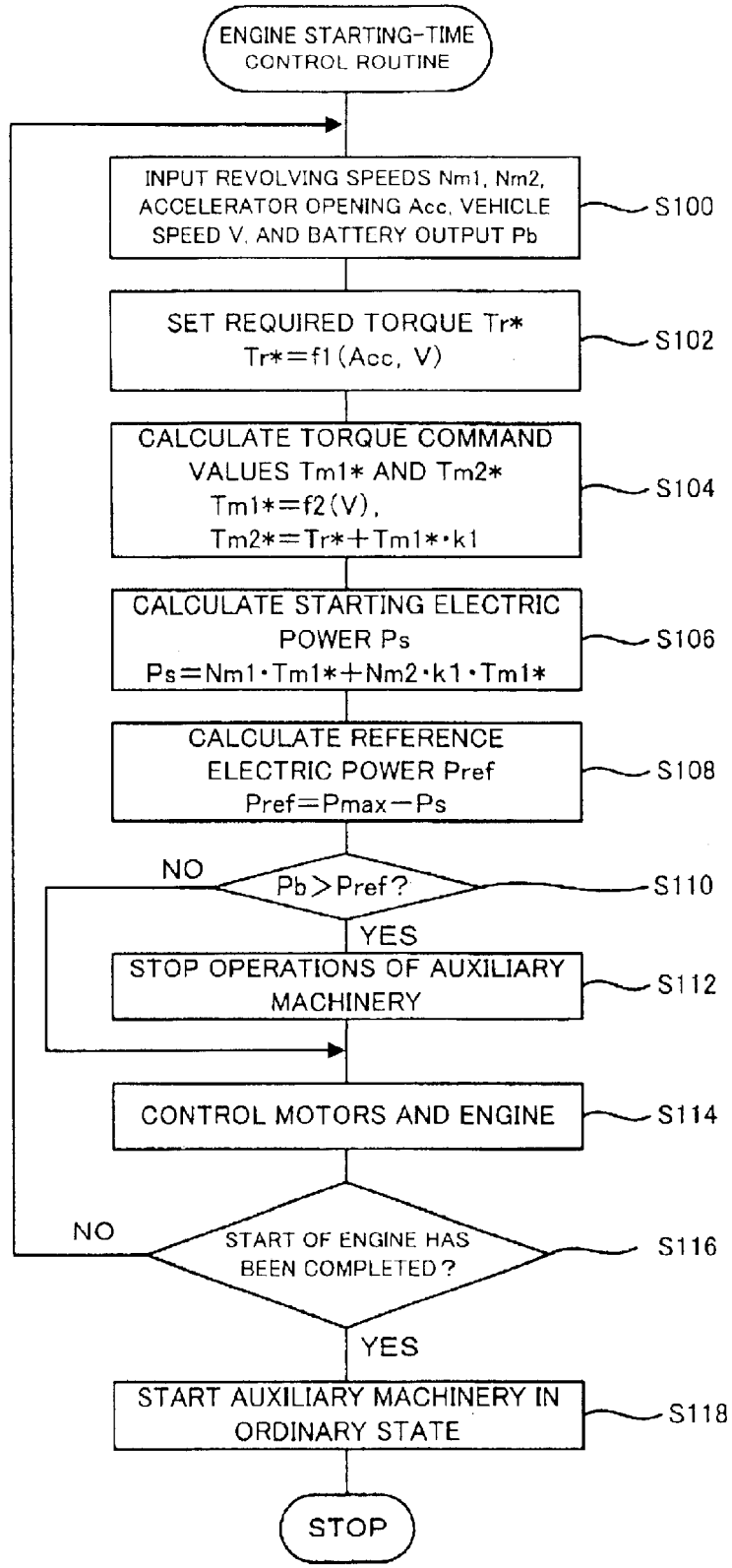
FIG. 2 is a flowchart showing a routine of engine starting-time control in a motor drive mode executed by a hybrid electronic control unit 70.
Figure 3:
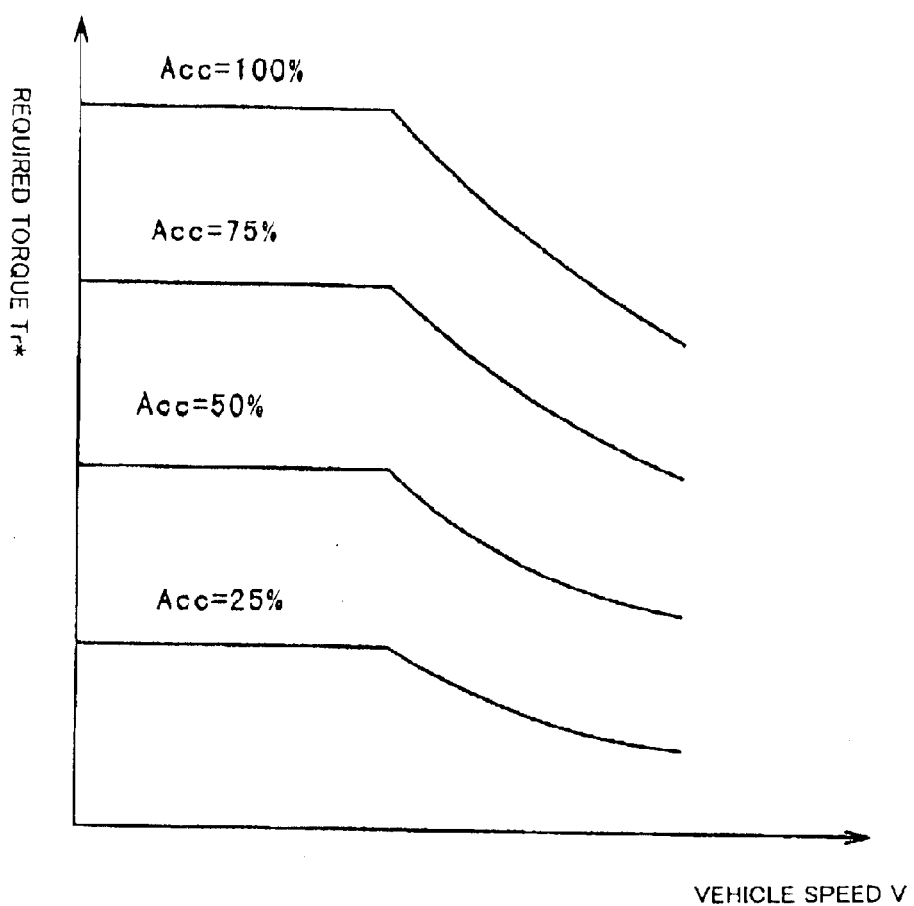
FIG. 3 shows an example of required torque setting map.

FIG. 2 is a flowchart showing a routine of engine starting-time control, which is executed by the hybrid electronic control unit 70 in response to the instruction of starting the engine 22 given during a run of the hybrid vehicle 20 in the motor drive mode. When the program enters the engine starting-time control routine, the CPU 72 of the hybrid electronic control unit 70 first reads the revolving speeds Nm1 and Nm2 of the motors MG1 and MG2 transmitted from the motor ECU 40 via communication, the accelerator opening Acc transmitted from the accelerator pedal position sensor 84, the vehicle speed V transmitted from the vehicle speed sensor 88, and a battery output Pb transmitted from the battery ECU 52 via communication (step S100). The CPU 72 sets a required torque Tr* for the ring gear shaft 32*a*, based on the input accelerator opening Acc and vehicle speed V (step S102). In this embodiment, the procedure stores experimental or empirical data representing a relation among the accelerator opening Acc, the vehicle speed V, and the required torque Tr* as a required torque setting map in advance in the ROM 74. The procedure reads and sets the required torque Tr* mapped to the input accelerator opening Acc and vehicle speed V from the required torque setting map. One example of the required torque setting map is shown in FIG. 3.

Figure 4:
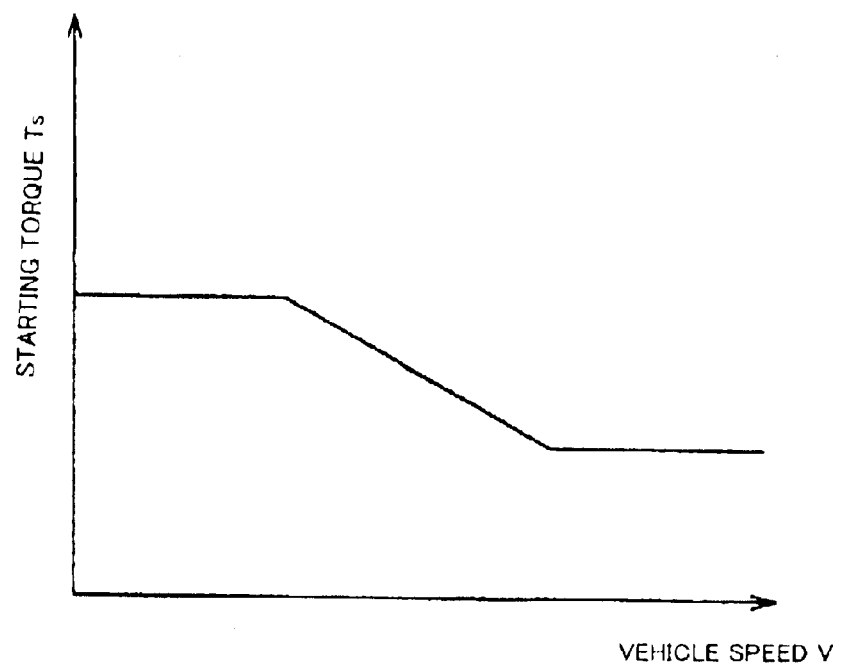
FIG. 4 shows an example of starting torque setting map.

The CPU 72 subsequently sets a starting torque Ts required for starting the engine 22 under the condition of the vehicle speed V to a torque command value Tm1* of the motor MG1, and calculates a torque command value Tm2* of the motor MG2 from the settings of the torque command value Tm1* of the motor MG1 and the required torque Tr* according to Equation (1) given below (step S104). In this embodiment, the procedure stores a relation between the starting torque Ts and the vehicle speed V as a starting torque setting map in advance in the ROM 74, and reads the starting torque Ts mapped to the input vehicle speed V from the starting torque setting map. One example of the starting torque setting map is shown in FIG. 4. As shown in the map of FIG. 4, the starting torque Ts is set to decrease with an increase in vehicle speed V. This is ascribed to the phenomena that the medium and high levels of the vehicle speed V cause smaller starting vibrations and that the motor MG1 functions as a generator. When the hybrid vehicle 20 runs under the ceased condition of the engine 22, the motor MG1 is inversely rotated. The speed of the inverse rotation of the motor MG1 increases with an increase in vehicle speed V. In the process of starting the engine 22, the starting torque Ts is output from the motor MG1. Part of the rotational energy of the rotor in the motor MG1 is applicable to start the engine 22. The higher revolving speed of the motor MG1 thus allows a smaller value to be set to the starting torque Ts. The procedure of this embodiment sets the starting torque Ts by taking into account this factor. In Equation (1), k1 denotes a constant used for calculation of a torque working as a reactive force of the ring gear 32 to output the torque from the sun gear 31 to the carrier 34, and depends upon the gear ratio of the power distribution and integration mechanism 30. The second term on the right side of Equation (1) accordingly represents a torque working as a reactive force of the motor MG2 to output the torque from the motor MG1 to the carrier 34. The torque command value Tm2* is the sum of this torque and the required torque Tr*.

$$Tm2^* = Tr^* + k1 \cdot Tm1^* \quad (1)$$

The CPU 72 then calculates a starting electric power Ps required for starting the engine 22 according to Equation (2) given below (step S106). The first term on the right side of Equation (2) represents a power output from the motor MG1 to start the engine 22, and the second term on the right side represents a power functioning as a reactive force of the motor MG2 to output the power from the motor MG1 to the carrier 34. For the simplicity of explanation, the efficiencies of the motors MG1 and MG2 are ignored for calculation of the starting electric power PS.

$$Ps = Nm1 \cdot Tm1^* + Nm2 \cdot k1 \cdot Tm1^* \quad (2)$$

The CPU 72 subtracts the calculated starting electric power Ps from a maximum battery electric power Pmax, which can be output from the battery 50, so as to calculate a reference electric power Pref used as a criterion of determining whether or not the operations of the auxiliary machinery 56 are to be stopped (step S108). The battery output Pb is compared with the calculated reference electric power Pref (step S110). The battery output Pb is the sum of a motor driving electric power Pm used to output the required torque Tr* from the motor MG2 and an auxiliary machinery driving electric power Pa used to drive the auxiliary machinery 56. The reference electric power Pref is obtained by subtracting the starting electric power Ps from the maximum battery electric power Pmax, as described above. When the battery output Pb is not greater than the reference electric power Pref, the electric power output from the battery 50 does not exceed the maximum battery electric power Pmax at a start of the engine 22 in the driving state of the auxiliary machinery 56. When the battery output Pb is greater than the reference electric power Pref, on the other hand, the electric power output from the battery 50 exceeds the maximum battery electric power Pmax at a start of the engine 22 in the driving state of the auxiliary machinery 56. In this case, the motor driving electric power Pm is greater than the differential electric power as subtraction of the starting electric power Ps and the auxiliary machinery driving electric power Pa from the maximum battery electric power Pmax.

When the battery output Pb is greater than the reference electric power Pref, the CPU 72 accordingly stops the operations of the auxiliary machinery 56 (step S112). The CPU 72 then drives the motors MG1 and MG2 with the settings of the torque command values Tm1* and Tm2*, while cranking and starting the engine 22 (step S114). The motor MG1 is controlled to attain the torque command value Tm1*. After a start of cranking the engine 22, however, the motor MG1 is under the revolving speed control to make the carrier 34 rotate at a predetermined speed, that is, to make the sun gear shaft 31a rotate at a corresponding speed. When the battery Pb is not greater than the reference electric power Pref, on the other hand, there is no need of stopping the operations of the auxiliary machinery 56. The CPU 72 accordingly starts the engine 22 in the driving state of the auxiliary machinery 56.

The series of processing at steps S100 through S114 is repeated until it is determined that the start of the engine 22 has been completed (step S116). When it is determined that the start of the engine 22 has been completed, the CPU 72 returns the conditions of the auxiliary machinery 56 to the ordinary operating status (step S118). The program then exits from the engine starting-time control routine.

Figure 5:
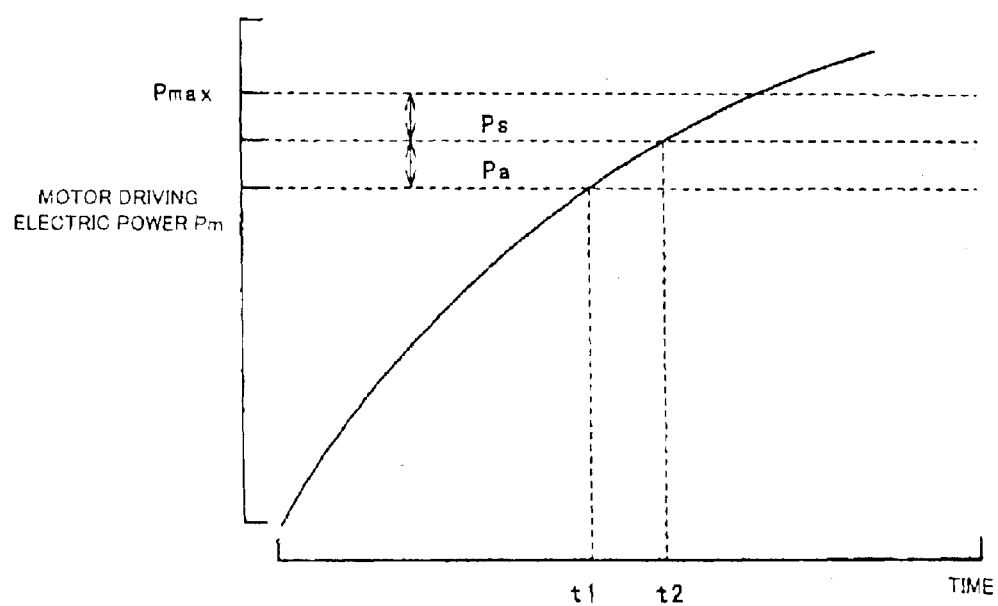
FIG. 5 shows a variation in battery output Pb with time at the time of an ordinary start.

In one example, it is assumed that the driver lightly steps on the accelerator pedal 83 for an ordinary start of the hybrid vehicle 20 of the embodiment, which is at a stop with a sufficient level of the state of charge (SOC) of the battery 50. The hybrid vehicle 20 sets the required torque Tr* to be output from the motor MG2 and starts in the motor drive mode with the increasing vehicle speed V. The instruction of starting the engine 22 is given at a limit of a drivable range in the motor drive mode, that is, at a timing immediately before a time when the motor driving electric power Pm reaches the differential electric power as subtraction of the starting electric power Ps from the maximum battery electric power Pmax. In the example of FIG. 5, the instruction of starting the engine 22 is given at a timing immediately before a time point t2. FIG. 5 shows a variation in motor driving electric power Pm with time at the time of starting the hybrid vehicle 20. The engine starting-time control routine (see FIG. 2) stops the operations of the auxiliary machinery 56 prior to the start of the engine 22, since it is determined that the battery output Pb is greater than the reference electric power Pref. The operations of the auxiliary machinery 56 are at a stop for a very short time period, until completion of the start of the engine 22. The stop of the auxiliary machinery 56 accordingly does not significantly affect the drive of the hybrid vehicle 20 or the operations of the power output apparatus. The control in this state causes the motor MG2 in the motor drive mode to be actuated in the range up to the level of the differential electric power as subtraction of the starting electric power Ps from the maximum battery electric power Pmax. This control procedure desirably heightens the upper limit of the motor driving electric power Pm by the auxiliary machinery driving electric power Pa and thereby extends the drivable range of the hybrid vehicle 20 in the motor drive mode, compared with the control of starting the engine 22 in the driving state of the auxiliary machinery 56, that is, the control of driving the motor MG2 by setting the differential electric power as subtraction of the starting electric power Ps and the auxiliary machinery driving electric power Pa from the maximum battery electric power Pmax, to the upper limit of the motor driving electric power Pm in the motor drive mode. In the motor drive mode, the differential electric power as subtraction of the starting electric power Ps from the maximum battery electric power Pmax is used as the driving electric power. The motor MG2 is to be driven in the range of this driving electric power. As described previously, the higher vehicle speed V leads to the smaller starting torque Ts and the smaller starting electric power Ps. The driving electric power accordingly increases with an increase in vehicle speed V.

When the driver heavily steps on the accelerator pedal 83 to start the hybrid vehicle 20, on the other hand, the motor MG2 can not sufficiently supply the required torque Tr*. The instruction of starting the engine 22 is accordingly given at the low vehicle speed V. Under the condition of the low vehicle speed V, the motor driving electric power Pm is a relatively low level, although a large torque is output from the motor MG1. In some cases, the motor driving electric power Pm is less than the differential electric power as subtraction of the starting electric power Ps and the auxiliary machinery driving electric power Pa from the maximum battery electric power Pmax. The engine starting-time control starts the engine 22 in the driving state of the auxiliary machinery 56, since the battery output Pb is not greater than the reference electric power Pref.

As described above, when the hybrid vehicle 20 of the embodiment runs with the ordinary level of depression of the accelerator pedal 83, the operations of the auxiliary machinery 56 are stopped until completion of a start of the engine 22. This arrangement effectively extends the drivable range of the hybrid vehicle 20 in the motor drive mode and ensures a smooth start of the engine 22. The hybrid vehicle 20 of the embodiment does not stop the operations of the auxiliary machinery 56 at the time of starting the engine 22, when the conditions allow for a start of the engine 22 in the continuous driving state of the auxiliary machinery 56. This arrangement effectively prevents any unnecessary stop of the operations of the auxiliary machinery 56.

In the hybrid vehicle 20 of the embodiment, the control procedure starts the engine 22 without stopping the operations of the auxiliary machinery 56, when the conditions allow for a start of the engine 22 in the continuous driving state of the auxiliary machinery 56. One possible modification may unconditionally stop the actuation of the auxiliary machinery 56 at the time of starting the engine 22.

In the hybrid vehicle 20 of the embodiment, a supply of electric power is fed from the battery 50 to the auxiliary machinery 56. At the time of starting the engine 22, actuation of the auxiliary machinery 56 is stopped until completion of the starting operation. In the case where the auxiliary machinery 56 consumes only little electric power or in the case where the electric power required for the auxiliary machinery 56 is not supplied from the battery 50, however, actuation of the auxiliary machinery 56 makes substantially no difference in the course of starting the engine 22. In the motor drive mode, the motor MG2 may be driven with the driving electric power that is equal to the differential electric power as subtraction of the starting electric power Ps from the maximum battery electric power Pmax. The engine 22 may thus be started without stopping the operations of the auxiliary machinery 56.

The power output apparatus mounted on the hybrid vehicle 20 of the embodiment causes the power from the engine 22 to be subjected to the torque conversion by means of the power distribution and integration mechanism 30 and the motors MG1 and MG2 and to be output to the ring gear shaft 32a or the drive shaft. The power output apparatus stops the operations of the auxiliary machinery 56, which receive supplies of electric power from the battery 50, and causes the motors MG1 and MG2 to output the required power and start the engine 22 with the electric power supplied from the battery 50. Instead of the power output apparatus of the embodiment, a power output apparatus of any appropriate structure satisfying the required conditions may be mounted on the hybrid vehicle. In the structure of the power output apparatus, one or multiple motors output the power to a drive shaft, in combination with an engine or alone in the stop conditions of the engine. The power output apparatus is provided with a secondary battery that may supply part of the electric power required for actuation of the motor, the electric power required for starting the engine, and the electric power required for actuation of the auxiliary machinery.

The above embodiments are to be considered in all aspects as illustrative and not restrictive. There may be many modifications, change, and alterations without departing from the scope or sprit of the main characteristics of the present invention. All changes within the meaning and range of equivalency of the claims are therefore intended to be embraced therein.

What is claimed is:

1. A power output apparatus that is capable of outputting power from an internal combustion engine and power from a driving motor to a drive shaft, said power output apparatus comprising:
   a secondary battery that supplies electric power to said driving motor;
   a starting module that starts said internal combustion engine with a supply of electric power from said secondary battery; and
   a control module that drives and controls said driving motor to output a required power in a preset range of driving electric power to said drive shaft while said internal combustion engine is at a stop, where the range of driving electric power is set as a difference between a maximum electric power output from said secondary battery and a starting electric power required by said starting module to start said internal combustion engine.

2. A power output apparatus in accordance with claim 1, wherein said control module sets the starting electric power in such a manner as to be lowered with an increase in revolving speed of said drive shaft, calculates the driving electric power from the setting of the starting electric power to drive and control said driving motor with the calculated driving electric power.

3. A power output apparatus in accordance with claim 1, said power output apparatus further comprising:
   a three-shaft power input and output module that has a first shaft linked with an output shaft of said internal combustion engine, a second shaft linked with said drive shaft, and a third shaft, where power input into and output from a residual one shaft among the three shafts is determined according to powers input into and output from any two shafts among the three shafts,
   wherein said starting module comprises a starting motor that is linked with said third shaft and is capable of generating electric power, and
   said driving motor is linked with said drive shaft.

4. A power output apparatus in accordance with claim 1, said power output apparatus further comprising:
   at least one auxiliary machinery that is driven with a supply of electric power from said secondary battery;
   wherein said control module drives and controls said at least one auxiliary machinery to stop its operation until completion of a start of said internal combustion engine, while controlling said starting module to start said internal combustion engine, in response to a starting requirement of said internal combustion engine that is at a stop.

5. A power output apparatus in accordance with claim 4, wherein said control module controls said starting module to start said internal combustion engine in a continuous driving state of said at least one auxiliary machinery, in response to the starting requirement of said internal combustion engine, when said driving motor is driven and controlled to output the required power to said drive shaft in a specific range of electric power calculated by subtracting electric power required for actuation of said at least one auxiliary machinery from the driving electric power.

6. A power output apparatus in accordance with claim 4, wherein said control module sets the starting electric power in such a manner as to be lowered with an increase in revolving speed of said drive shaft, calculates the driving electric power from the setting of the starting electric power to drive and control said driving motor with the calculated driving electric power, and controls said starting module to start said internal combustion engine with the setting of the starting electric power.

7. A power output apparatus in accordance with claim 4, said power output apparatus further comprising:

a three-shaft power input and output module that has a first shaft linked with an output shaft of said internal combustion engine, a second shaft linked with said drive shaft, and a third shaft, where power input into and output from a residual one shaft among the three shafts is determined according to powers input into and output from any two shafts among the three shafts, wherein said starting module comprises a starting motor that is linked with said third shaft and is capable of generating electric power, and said driving motor is linked with said drive shaft.

8. An automobile that is driven with power from the internal combustion engine and power from the driving motor, which are output to the drive shaft linked with an axle, said automobile comprising:

a secondary battery that supplies electric power to said driving motor;

a starting module that starts said internal combustion engine with a supply of electric power from said secondary battery; and a control module that drives and controls said driving motor to output a required power in a preset range of driving electric power to said drive shaft while said internal combustion engine is at a stop, where the range of driving electric power is set as a difference between a maximum electric power output from said secondary battery and a starting electric power required by said starting module to start said internal combustion engine.

9. An automobile in accordance with claim 8, wherein said control module sets the starting electric power in such a manner as to be lowered with an increase in revolving speed of said drive shaft, calculates the driving electric power from the setting of the starting electric power to drive and control said driving motor with the calculated driving electric power.

10. An automobile in accordance with claim 8, said automobile further comprising:

a three-shaft power input and output module that has a first shaft linked with an output shaft of said internal combustion engine, a second shaft linked with said drive shaft, and a third shaft, where power input into and output from a residual one shaft among the three shafts is determined according to powers input into and output from any two shafts among the three shafts, wherein said starting module comprises a starting motor that is linked with said third shaft and is capable of generating electric power, and said driving motor is linked with said drive shaft.

11. An automobile in accordance with claim 8, said automobile further comprising:

at least one auxiliary machinery that is driven with a supply of electric power from said secondary battery;

wherein said control module drives and controls said at least one auxiliary machinery to stop its operation until completion of a start of said internal combustion engine, while controlling said starting module to start said internal combustion engine, in response to a starting requirement of said internal combustion engine that is at a stop.

12. An automobile in accordance with claim 11, wherein said control module controls said starting module to start said internal combustion engine in a continuous driving state of said at least one auxiliary machinery, in response to the starting requirement of said internal combustion engine, when said driving motor is driven and controlled to output the required power to said drive shaft in a specific range of electric power calculated by subtracting electric power required for actuation of said at least one auxiliary machinery from the driving electric power.

13. An automobile in accordance with claim 11, wherein said control module sets the starting electric power in such a manner as to be lowered with an increase in revolving speed of said drive shaft, calculates the driving electric power from the setting of the starting electric power to drive and control said driving motor with the calculated driving electric power, and controls said starting module to start said internal combustion engine with the setting of the starting electric power.

14. An automobile in accordance with claim 11, said automobile further comprising:

a three-shaft power input and output module that has a first shaft linked with an output shaft of said internal combustion engine, a second shaft linked with said drive shaft, and a third shaft, where power input into and output from a residual one shaft among the three shafts is determined according to powers input into and output from any two shafts among the three shafts, wherein said starting module comprises a starting motor that is linked with said third shaft and is capable of generating electric power, and said driving motor is linked with said drive shaft.

15. A control method of controlling a power output apparatus, which comprises an internal combustion engine that is capable of outputting power to a drive shaft, a driving motor that is capable of outputting power to said drive shaft, a secondary battery that supplies electric power to said driving motor, and a starting module that starts said internal combustion engine with a supply of electric power from said secondary battery, said control method comprising the steps of:

driving and controlling said driving motor to output a required power in a preset range of driving electric power to said drive shaft while said internal combustion engine is at a stop, where the range of driving electric power is set as a difference between a maximum electric power output from said secondary battery and a starting electric power required by said starting module to start said internal combustion engine.

16. A control method in accordance with claim 15, further comprising the step of:

setting the starting electric power in such a manner as to be lowered with an increase in revolving speed of said drive shaft, calculating the driving electric power from the setting of the starting electric power to drive and control said driving motor with the calculated driving electric power.

17. A control method of controlling a power output apparatus, which comprises an internal combustion engine that is capable of outputting power to a drive shaft, a driving motor that is capable of outputting power to said drive shaft, a secondary battery that supplies electric power to said driving motor, a starting module that starts said internal combustion engine with a supply of electric power from said secondary battery, and at least one auxiliary machinery that is driven with a supply of electric power from said secondary battery, said control method comprising the steps of:

driving and controlling said driving motor to output a required power in a preset range of driving electric power to said drive shaft while said internal combustion engine is at a stop, where the range of driving electric power is set as a difference between a maximum electric power output from said secondary battery and a starting electric power required by said starting module to start said internal combustion engine, driving and controlling said at least one auxiliary machinery to stop its operation until completion of a start of said internal combustion engine, while controlling said starting module to start said internal combustion engine, in response to a starting requirement of said internal combustion engine that is at a stop.

18. A control method in accordance with claim 17, further comprising the step of:

controlling said starting module to start said internal combustion engine in a continuous driving state of said at least one auxiliary machinery, in response to the starting requirement of said internal combustion engine, when said driving motor is driven and controlled to output the required power to said drive shaft in a specific range of electric power calculated by subtracting electric power required for actuation of said at least one auxiliary machinery from the driving electric power.

19. A control method in accordance with claim 17, further comprising the step of:

setting the starting electric power in such a manner as to be lowered with an increase in revolving speed of said drive shaft, calculating the driving electric power from the setting of the starting electric power to drive and control said driving motor with the calculated driving electric power, and controlling said starting module to start said internal combustion engine with the setting of the starting electric power.

20. A power output apparatus that is capable of outputting power from an internal combustion engine and power from a driving motor to a drive shaft, said power output apparatus comprising:

chargeable dischargeable accumulator means for supplying electric power to said driving motor;

starting means for starting said internal combustion engine with a supply of electric power from said secondary battery; and control means for driving and controlling said driving motor to output a required power in a preset range of driving electric power to said drive shaft while said internal combustion engine is at a stop, where the range of driving electric power is set as a difference between a maximum electric power output from said secondary battery and a starting electric power required by said starting module to start said internal combustion engine.

* * * * *